United States Patent [19]
Garrett et al.

[11] Patent Number: 5,092,524
[45] Date of Patent: Mar. 3, 1992

[54] NOZZLE THROAT DISC FOR THRUST VECTORING

[75] Inventors: Timothy M. Garrett, Florissant; David E. Zilz, St. Charles County, both of Mo.

[73] Assignee: McDonnell Douglas Corporation, Long Beach, Calif.

[21] Appl. No.: 478,929

[22] Filed: Feb. 12, 1990

[51] Int. Cl.$^5$ .................................................. B64C 15/02
[52] U.S. Cl. ................................ 239/265.19; 244/52; 60/230
[58] Field of Search .................... 239/265.19; 244/51, 244/52; 60/230

[56] References Cited

U.S. PATENT DOCUMENTS

| | | | |
|---|---|---|---|
| 2,693,079 | 11/1954 | Rau | 239/265.19 |
| 2,943,821 | 7/1960 | Wetherbee, Jr. | 244/52 |
| 3,096,049 | 7/1963 | Karasinski | 244/52 |
| 3,693,880 | 9/1972 | Versaw et al. | |
| 3,743,184 | 7/1973 | Mancus | |
| 3,749,317 | 7/1973 | Osofsky | 239/265.19 |
| 3,774,868 | 12/1972 | Goetz | |
| 3,907,222 | 9/1975 | McComas et al. | |
| 3,970,253 | 7/1976 | Burkes et al. | |
| 4,050,631 | 9/1977 | Syltebo | 244/52 X |
| 4,143,837 | 3/1979 | Thunholm | |
| 4,168,031 | 9/1979 | McCullough et al. | 239/265.19 |
| 4,274,610 | 6/1981 | Bastian | |
| 4,627,586 | 12/1986 | Krumins et al. | |
| 4,641,782 | 2/1987 | Woodward | |

OTHER PUBLICATIONS

SAE Journal, "Jet Deflection Devices . . . ", Jan. 1958, pp. 64–65.

Primary Examiner—Andres Kashnikow
Assistant Examiner—William Grant
Attorney, Agent, or Firm—James M. Skorich; John P. Scholl; Gregory A. Cone

[57] ABSTRACT

Tapered disc rotatably mounted in the exhaust duct of a propulsion system. The disc can be rotated about an axis normal to the yaw plane. A disc bump projects from both the upper and lower surfaces of the disc, and extends diametrically across it. When fluid is flowing through the exhaust duct, the bump, together with the opposing surfaces of the exhaust duct, chokes the flow and causes a sonic plane to be formed at the bump. The supersonic flow downstream of the disc bump remains approximately normal to the bump for angles of rotation of up to 20° from normality between the bump and the upstream flow. Rotation of the disc thus causes deflection or turning of the fluid flow. The resultant thrust vectoring enables the yaw of the propulsion system and, therefore, a vehicle containing the propulsion system, to be controlled.

17 Claims, 3 Drawing Sheets

NOZZLE THROAT DISC FOR THRUST VECTORING

The United States Government has a royalty-free license for the practice of this invention as provided for by the terms of a contract awarded to the patent owner by an agency of the United States Government.

BACKGROUND OF THE INVENTION

1. Field of the Invention

This invention relates to thrust vectoring for a ducted propulsion system and, more particularly, a rotatable disc located in the throat of a choked flow nozzle which vectors the engine thrust by being rotated to various angles.

2. Description of the Prior Art

Any vehicle propelled through a medium must have a means to control its direction of travel. Directional control systems are comprised essentially of means for selectively rotating the vehicle about three normal axes, with all three axes being relative to the center of gravity of the vehicle. Rotation about the axial axis is called roll, rotation about the lateral axis is called pitch, and rotation about the vertical axis is known as yaw.

This invention is directed to controlling yaw. However, as will subsequently become clear, it could alternatively be used to control or effect pitch if its axis of rotation were itself rotated by 90° from the orientation shown in the described embodiment.

The conventional device for controlling yaw for a flight vehicle is a vertical stabilizer and hinged rudder located aft of the vehicle's center of gravity. The rudder typically comprises the aft section of the vertical stabilizer. The stabilizer and rudder project radially outward from the external skin of the vehicle. Use of this apparatus causes an increase in skin friction drag and pressure drag for the vehicle, compared to what the magnitude of these drag components would be if the vehicle had no such projecting structure.

The surface area of the rudder must be adequate to provide sufficient force to control yaw at the minimum flight velocity of the vehicle. However, this area is more than enough to control the vehicle at higher velocities, and thus results in excessive drag at velocity greater than the minimum flight velocity. The rudder must also have sufficient area to provide the vehicle with the desired degree of maneuverability. Again, designing the rudder to have the capability of providing the desired degree of maneuverability penalizes the vehicle with drag when the capability to maneuver is not being fully utilized.

One approach to this problem has been to place a hinged rudder or rotatable vane in the exhaust housing of a ducted engine. This results in a smoother aerodynamic shape for the external skin. However, when the exhaust flow is supersonic, the placement of a rudder or rotatable vane in supersonic flow creates shock waves which reduce the thrust as well as the control force which would otherwise be generated by a given rudder deflection.

Examples of the use of a rotatable rudder or vane to deflect flow downstream of the throat of a nozzle are shown in U.S. Pat. No. 3,970,253 issued to William M. Burkes and William H. Miller, in U.S. Pat. No. 3,743,184 issued to H. Vincent Mancus, and in U.S. Pat. No. 3,774,868 issued to Gerald F. Goetz.

SUMMARY OF THE INVENTION

Briefly, the present invention is a disc located in the throat of a choked nozzle, which is a part of a propulsion system. The disc is mounted on a trunion having its axis of rotation parallel to the yaw axis of a flight vehicle containing the propulsion system. The disc tapers from its maximum thickness at its axis of rotation, to a thinner cross-section as it extends radially towards its circumference. A rounded disc bump is located along a diameter of the disc and protrudes from both surfaces of the disc.

The fluid flow is choked as it passes over the disc bump when the disc bump is normal to the upstream flow, as well as for any rotation of up to approximately 20° of the disc in either direction from the aforementioned normal orientation of the disc bump. When the disc is rotated, the supersonic exhaust flow turns in order to expand normally to the changed orientation of the disc bump. Vectoring of the thrust is thus obtained by rotating the throat disc.

The present invention obtains thrust vectoring by means of a lightweight, mechanically simple apparatus, in contradistinction to the heavy and complex devices of the prior art that are used to move deflection vanes.

The disc of the present invention forms the sonic plane in the throat of the nozzle, and turns the direction of the thrust generated by the propulsion system by changing the angle of the sonic plane relative to the streamlines of the upstream fluid flow. The present invention is thus able to achieve thrust vectoring without the problems and drawbacks attendant to interrupting or deflecting the supersonic flow downstream of a choked exhaust nozzle.

The present invention may be used to augment conventional yaw control devices, or replace them entirely. For example, the use of the present invention would allow the area of the vertical stabilizer and rudder on a flight vehicle to be reduced or possibly permit the vertical stabilizer and rudder to be eliminated altogether. In either case, such a modification would afford the flight vehicle with a reduction in drag, while providing necessary yaw control at minimum flight speed as well as the desired degree of maneuverability.

Modern fly-by-wire flight control systems, used in conjunction with the thrust vectoring of the present invention, can compensate for the loss of the passive directional stability otherwise provided by the vertical stabilizer. The invention thus allows the designer to take full advantage of modern flight control technology and translate it into decreased drag and weight, thereby enhancing the performance of a flight vehicle without sacrificing maneuverability or stability.

DETAILED DESCRIPTION OF THE DRAWINGS

Figure 1:
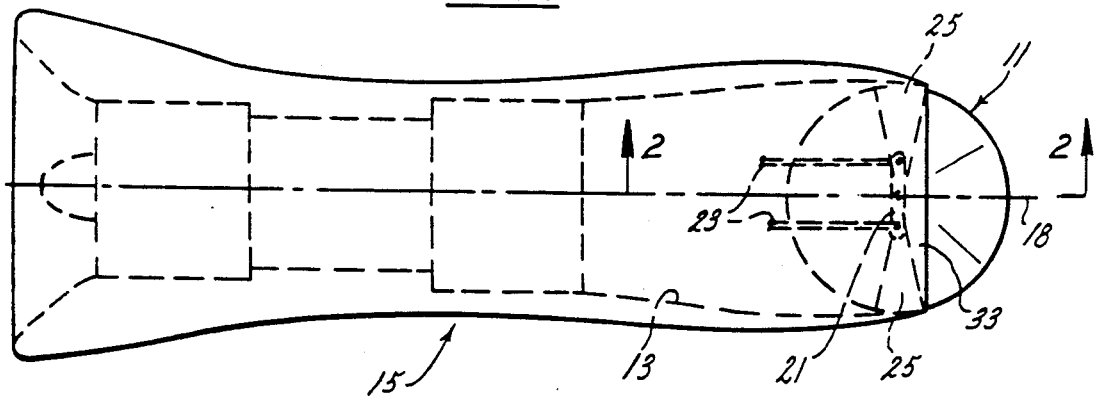
FIG. 1 is a plan view of a propulsion system incorporating the present invention.
Figure 2:
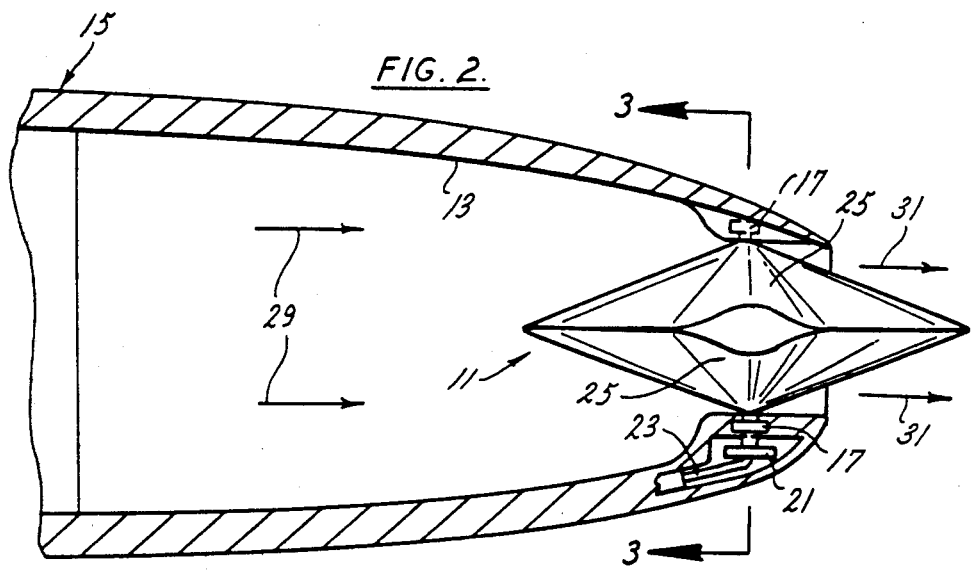
FIG. 2 is a sectional view of the present invention taken along line 2—2 of FIG. 1.
Figure 3:
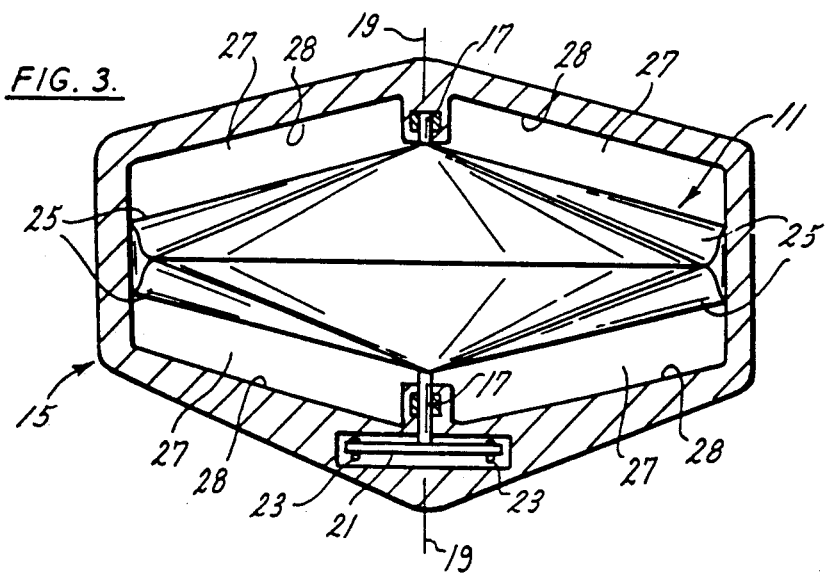
FIG. 3 is a sectional view of the present invention taken along line 3—3 of FIG. 2.

Turning to the drawings, FIG. 1 shows a plan view of throat disc 11, installed in exhaust duct 13 of propulsion system 15. FIG. 2 shows a sectional view of exhaust duct 13, and provides a more detailed view of throat disc 11 located therein. FIG. 2 is a sectional view taken along line 2—2 of FIG. 1. FIG. 3 is obtained by taking a sectional view along line 3—3 of FIG. 2. (Throat disc 11 is not sectioned in either FIGS. 2 or 3.)

Throat disc 11 is a circular disc that is rotatably mounted in exhaust duct 13 by means of trunion 17. Exhaust duct 13 has duct centerline 18. Trunion 17 allows throat disc 11 to rotate about axis of rotation 19. Axis of rotation 19 is normal to duct centerline 18.

Turning lever 21 is attached to an end of trunion 17. One end of cables 23 are attached to each end of turning lever 21. The other end of cables 23 are attached to a motor (not shown). Actuation of the motor causes cables 23 to rotate turning lever 21 and trunion 17, thereby causing the rotation of throat disc 11 about axis of rotation 19.

Throat disc 11 tapers from its maximum thickness at axis of rotation 19, to a thinner cross-section as it extends radially outward towards its edge. Disc bump 25 projects from both of the surfaces of throat disc 11, and is symmetrical about disc bump centerline 26. Disc bump centerline 26 coincides with a diameter of throat disc 11.

Throat 27 in exhaust duct 13 is formed by the maximum thickness of disc bump 25 and the opposing inner surfaces 28 of exhaust duct 13. A sectional view of throat 27 for the neutral position of throat disc 11, shown in FIGS. 1 and 2, is shown in FIG. 3. During the operation of propulsion system 15, the flow becomes choked sonic flow in the plane of throat 27. The subsonic flow upstream of throat 27 is denoted as streamlines 29, whereas the supersonic flow downstream of throat 27 is denoted as streamlines 31.

Figure 5:
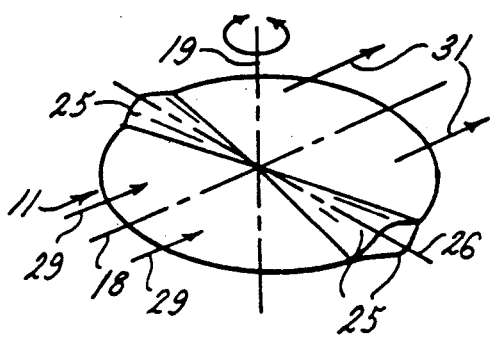
FIG. 5 is a perspective view of the throat disc of the present invention which shows the streamlines when the diametrical disc bump is oriented normal to the fluid flow.

FIG. 5 shows throat disc 11 in its neutral position, with disc bump 25 situated normal to subsonic streamlines 29. In this orientation, streamlines 31 are also normal to disc bump 25, and no thrust vectoring is obtained. Alternatively stated, the angle of rotation $\alpha$ of disc bump 25, and the deflection angle $\delta$ between streamlines 31 and the centerline 18 of exhaust duct 13, are both 0°.

Figure 7:
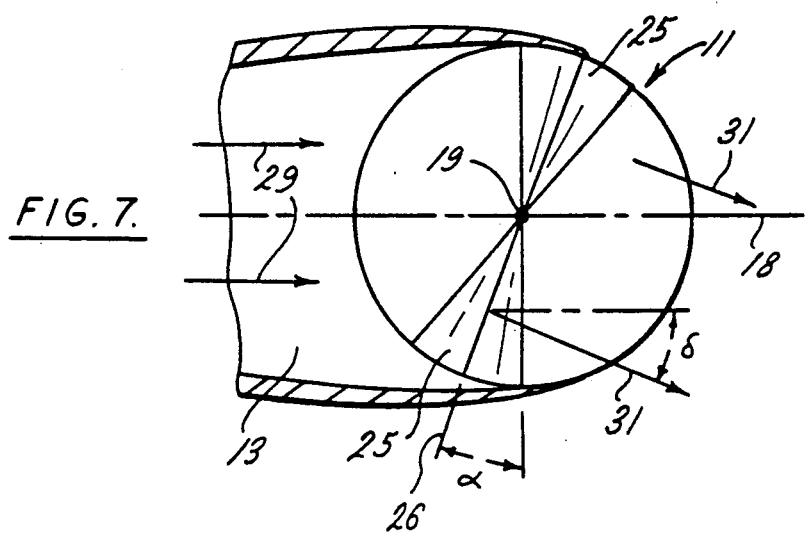
FIG. 7 is a plan view of the throat disc of the present invention located in the duct of a propulsion system. The disc has been turned so that the disc bump is at the same angle relative to the upstream fluid flow as shown in FIG. 6.
Figure 6:
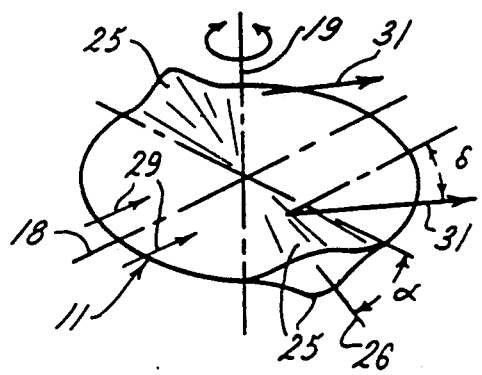
FIG. 6 is a perspective view of the throat disc of the present invention when it has been rotated so that the disc bump is at an angle to the upstream fluid flow, thereby causing a change in direction of the thrust vector.

FIGS. 6 and 7 show perspective and plan views, respectively, of throat disc 11 turned at angle of rotation $\alpha$. In both figures, supersonic streamlines 31 are shown as having turned through deflection angle $\delta$ from duct centerline 18 and subsonic streamlines 29. Rotating throat disc 11 and disc bump 25 through an angle of rotation $\alpha$ causes the same angular change from normality between disc bump 25 and the upstream subsonic flow represented by streamlines 29.

As the subsonic fluid flow of streamlines 29 approaches disc bump 25, the cross-sectional area of exhaust duct 13 decreases and the velocity of the fluid flow of streamlines 29 increases until it becomes sonic at the choke plane formed at throat 27. After passing through throat 27, the compressed fluid expands and accelerates approximately normal to disc bump 25 because the pressure in the normal direction will be the lowest for every streamline.

Figure 8:
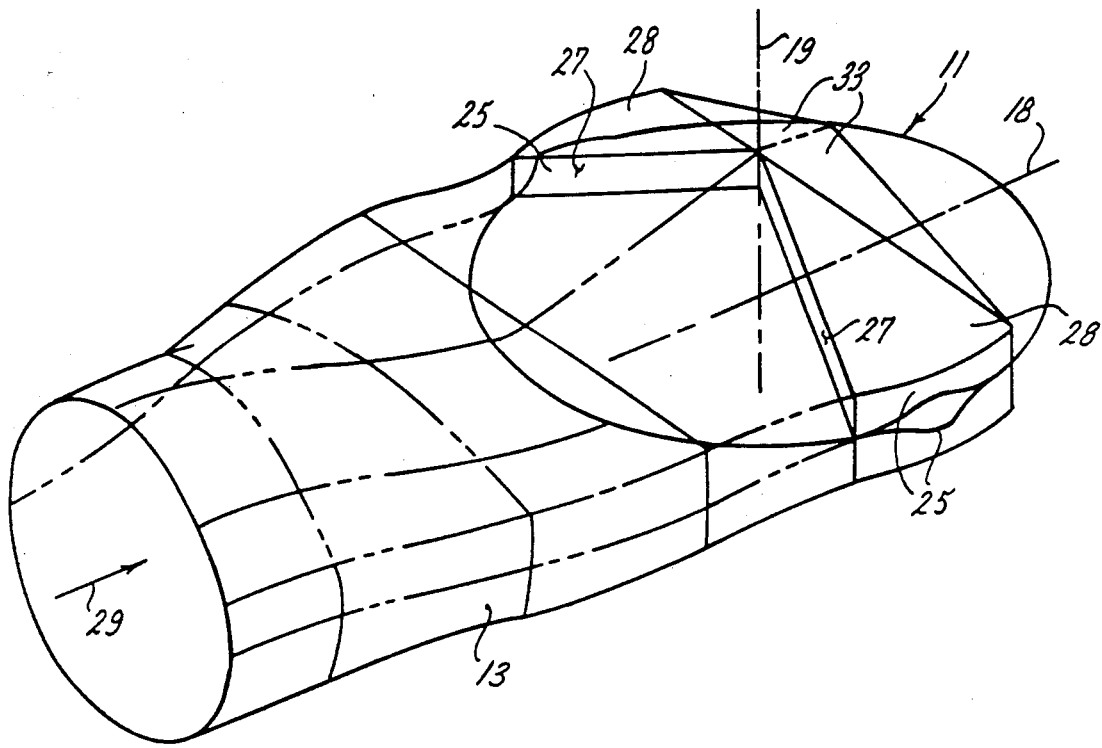
FIG. 8 is a perspective view of the throat disc of the present invention shown installed in the exhaust duct of a propulsion system. The exhaust duct is shown in phantom.

As indicated in FIG. 8, opposing inner surfaces 28 of exhaust duct 13 are surfaces of revolution shaped to form a sonic choke plane at throat 27 for all values of $\alpha$ of disc bump 25 up to the design limit of 20°. The sonic choke plane formed at throat 27 thus rotates with the rotation of throat disc 11. It follows that when disc bump 25 is at rotation angle $\alpha$, the flow will tend to be deflected normal to disc bump 25 at deflection angle $\delta$, which will be approximately equal to rotation angle $\alpha$.

Figure 9:
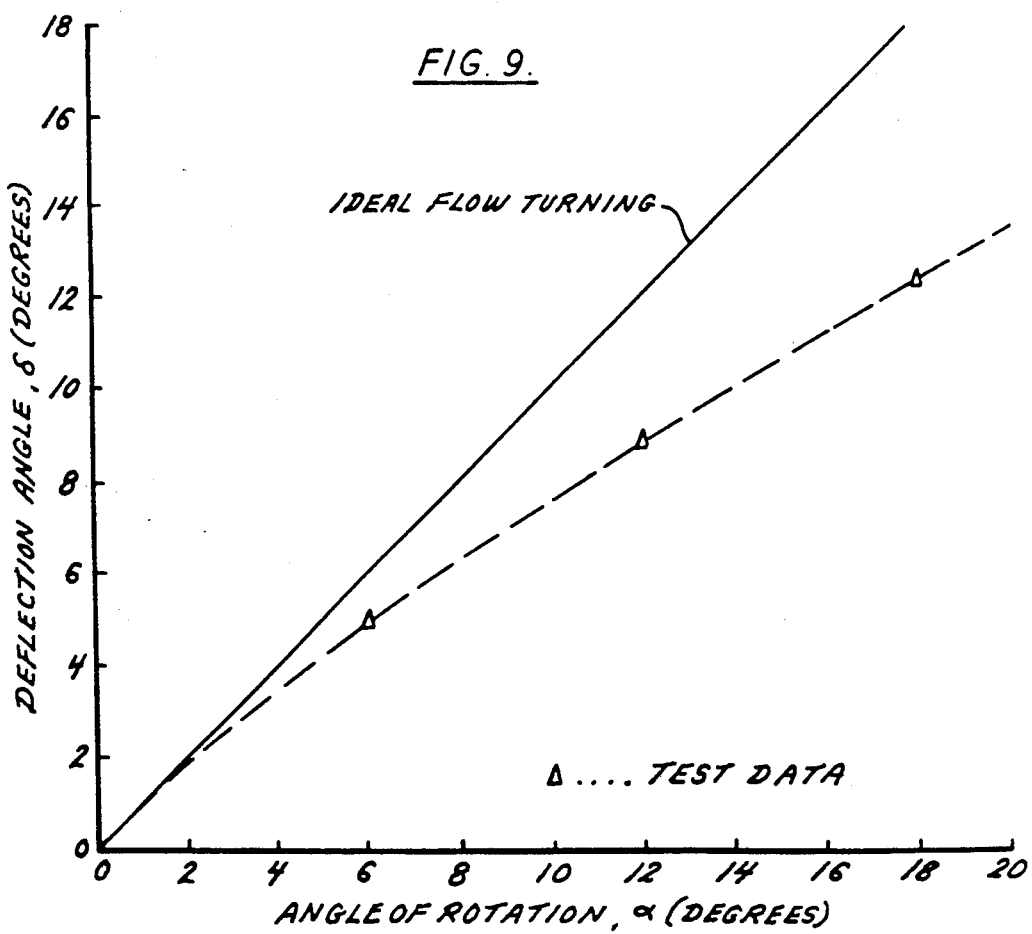
FIG. 9 is a graph of initial test results displaying the angle through which the flow is deflected versus the angle of rotation of the disc bump from a normal orientation to the upstream fluid flow.
Figure 4:
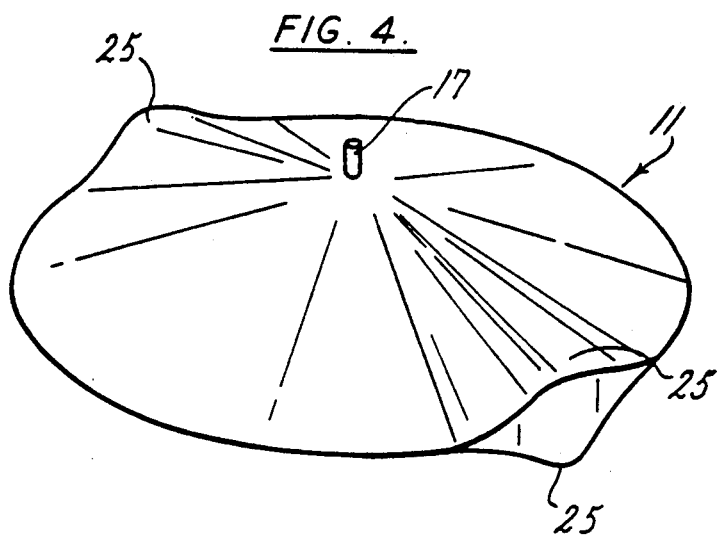
FIG. 4 is a perspective view of the throat disc of the present invention.

Confirmation of this theory and the ability of the present invention to turn the flow and vector thrust by rotating throat disc 11 is demonstrated with experimental data obtained with a static thrust stand and presented in FIG. 9. This drawing is a graph plotting the deflection angle $\delta$ of streamlines 31 against the angle of rotation $\alpha$ of disc bump 25. The drawing compares test data, denoted with the symbol $\Delta$, with the ideal flow turning, indicated with a solid line. As can be seen, the test data shows a meaningful correlation between $\alpha$ and $\delta$ up to approximately 20°.

Also shown in FIG. 8 is expansion shroud 33, which is situated downstream of opposing inner surfaces 28 of exhaust duct 13.

The foregoing description of an embodiment of the present invention explains how the thrust vectoring obtained through its use can control the yaw of a flight vehicle. However, as previously mentioned, another embodiment of the present invention could control the pitch of a flight vehicle about its center of gravity. The foregoing embodiment would be a variation of the described embodiment obtained by rotating axis of rotation 19 of throat disc 11 by 90° about duct centerline 18, while keeping axis of rotation 19 in a plane normal to duct centerline 18.

Changes and modifications in the specifically described embodiment can be carried out without departing from the scope of the invention which is intended to be limited only by the scope of the appended claims.

What is claimed is:

1. An apparatus for vectoring thrust generated by a flowing medium comprising:
   a duct adapted for flow of the flowing medium therethrough, said duct having:
   a centerline; and
   a vectoring member having:
   an axis of rotation;
   a first surface;
   a second surface generally opposite from said first surface; and
   an elongated bump projecting from said first and second surfaces and intersecting said axis of rotation, said vectoring member being mounted in said duct so that said vectoring member can rotate about said axis of rotation, said duct further including:
  a passageway defined by said vectoring member and said duct, with said passageway having a minimum cross section located in a plane including said axis of rotation, whereby medium flowing through said duct is choked at said plane.

2. The thrust vectoring apparatus recited in claim 1 wherein said vectoring member has:
  a periphery at least a portion of which is circular, said vectoring member being tapered and having its maximum thickness along said axis of rotation.

3. The thrust vectoring apparatus recited in claim 2 wherein said axis of rotation of said vectoring member lies normal to said duct centerline.

4. The thrust vectoring apparatus recited in claim 3 wherein said duct comprises an exhaust section of a propulsion system.

5. The thrust vectoring apparatus recited in claim 2 wherein said bump extends across the entirety of said first and said second surfaces of said vectoring member and has:
  a centerline, said axis of rotation of said vectoring member and said bump centerline defining a vectoring plane, said vectoring member being capable of deflecting medium flowing through said duct so that the medium flows approximately normal to said vectoring plane upon crossing said bump.

6. The thrust vectoring apparatus recited in claim 5 wherein said axis of rotation lies normal to said duct centerline.

7. The thrust vectoring apparatus recited in claim 6 further including:
  means for controllably rotating said vectoring member up to an angle of approximately 20° from normality between said vectoring plane and said duct centerline.

8. The thrust vectoring apparatus recited in claim 2 wherein said first and second surfaces of said vectoring member are generally conically shaped.

9. An apparatus for vectoring thrust comprising:
  deflection means for forming a throat in a duct, for creating a sonic choke plane in the throat, and for deflecting medium flowing through said duct at said sonic choke plane; and
  said sonic choke plane being rotatable about an axis of rotation which is stationary relative to said duct, whereby the direction of medium flowing through said duct is changed by rotation of said sonic choke plane.

10. An apparatus for vectoring thrust comprising:
  deflection means for forming a throat in a duct, for creating a sonic choke plane in the throat, and for deflecting medium flowing through said duct at said sonic choke plane;
  said deflection means being rotatable about an axis of rotation; and
  said sonic choke plane being rotatable about an axis of rotation which is colinear with said axis of rotation of said deflection means, whereby the direction of medium flowing through said duct is changed by rotation of said deflection means.

11. An apparatus for vectoring thrust comprising:
  a disc having:
    a center;
    a periphery of which at least a portion is circular, said disc tapering from a maximum thickness at its center; and
    an elongated bump projecting from said disc and passing across the center of said disc;
  said disc forming a throat in a duct and being capable of creating a sonic choke plane in the throat; and
  means for controllably rotating said disc, the rotation of said disc causing rotation of said sonic choke plane relative to said duct whereby medium flowing through said duct can be deflected through an angle of deflection, and said angle of deflection can be continuously changed by said means for controllably rotating said disc.

12. The thrust vectoring apparatus recited in claim 11 wherein said disc has:
  an axis of rotation located in said sonic choke plane, whereby rotation of said disc about said axis of rotation causes a change in said angle of deflection of medium flowing through said duct.

13. The thrust vectoring apparatus recited in claim 12 wherein rotation of said disc about said axis of rotation by a first magnitude in a first direction changes said angle of deflection by approximately said first magnitude in said first direction up to approximately 20° of rotation of said disc from a position for which said angle of deflection is 0°.

14. The thrust vectoring apparatus recited in claim 13 wherein said duct comprises an exhaust section of a propulsion system.

15. An apparatus for vectoring thrust comprising:
  a propulsion system; and
  a tapered disc located in said propulsion system, said disc being rotatable and having:
    a center;
    an axis of rotation passing through said disc center; and
    an elongated bump projecting from said disc, said bump having:
      a centerline which intersects said axis of rotation; and
      a deflection plane including said bump centerline and said axis of rotation, said disc being capable of deflecting thrust generated by said propulsion system in a direction approximately normal to said deflection plane when said plane is at an angle of incidence other than normal to medium flow upstream of said bump.

16. The thrust vectoring apparatus recited in claim 15 wherein said disc is capable of creating a sonic choke plane coincident with said deflection plane, whereby said direction of deflected thrust is approximately normal to said sonic choke plane.

17. The thrust vectoring apparatus recited in claim 16 further including:
  means for rotating said disc so that said disc is capable of changing said direction of deflected thrust while thrust is being generated by said propulsion system.

* * * * *